United States Patent [19]
Claridge et al.

[11] Patent Number: 5,754,551
[45] Date of Patent: May 19, 1998

[54] RING COMMUNICATION SYSTEM AND METHOD FOR CONNECTING A PLURALITY OF END STATIONS

[75] Inventors: Philip G. Claridge, Bucks; David A. J. Pearce, Buckinghamshire, both of United Kingdom

[73] Assignee: Madge Networks Limited, Buckinghamshire, England

[21] Appl. No.: 446,784

[22] PCT Filed: Sep. 27, 1994

[86] PCT No.: PCT/GB94/02104

§ 371 Date: Jul. 7, 1995

§ 102(e) Date: Jul. 7, 1995

[87] PCT Pub. No.: WO95/09502

PCT Pub. Date: Apr. 6, 1995

[30] Foreign Application Priority Data

Sep. 28, 1993 [GB] United Kingdom ............... 9319937

[51] Int. Cl.[6] .................... H04L 12/403; H04L 12/42
[52] U.S. Cl. ................ 370/452; 370/223; 370/403; 370/404; 340/825.02
[58] Field of Search ................ 370/452, 450, 370/351, 372, 360, 244, 294, 412, 404, 401, 402, 403, 405, 454, 223, 456; 340/825.5, 825.05, 825.02; 395/200.06

[56] References Cited

U.S. PATENT DOCUMENTS

| | | | |
|---|---|---|---|
| 5,155,726 | 10/1992 | Spinney et al. | 370/452 |
| 5,337,311 | 8/1994 | Herzberg et al. | 370/452 |
| 5,414,700 | 5/1995 | Yang et al. | 370/452 |
| 5,490,145 | 2/1996 | Tanabe et al. | 370/452 |

FOREIGN PATENT DOCUMENTS 0439008   7/1991   European Pat. Off. ............... 370/452

*Primary Examiner*—Wellington Chin
*Assistant Examiner*—Melissa Kay Carman
*Attorney, Agent, or Firm*—Sughrue, Mion, Zinn, Macpeak & Seas, PLLC

[57] ABSTRACT

A method of connecting a new end station to a ring communication system for connecting a number of end stations is constituted by the steps of: i) sensing an attempt by the new end station to attach to the ring; ii) determining whether there is a single end station only existing on the ring; and, iiia) if it is determined that there is more than one end station on the ring, allowing the new end station to attach to the ring and maintaining the ring communication configuration; or b) if it is determined that there is a single end station only on the ring, breaking the ring configuration and setting up two separate communication paths between the new end station and the existing end station.

7 Claims, 2 Drawing Sheets

RING COMMUNICATION SYSTEM AND METHOD FOR CONNECTING A PLURALITY OF END STATIONS

FIELD OF THE INVENTION

The invention relates to a method of operating a ring communication system, for example based on a token ring or FDDI communication protocol.

DESCRIPTION OF THE BACKGROUND ART

In a conventional ring based data communication system a token passing or similar scheme is used to control access to the ring by end stations. These end stations are typically then connected together via a hub containing control systems and the like.

Ring communication systems can support large numbers of end stations but for small numbers of end stations, particularly two end stations, the communication protocol can slow down network throughput.

Where only two end stations are communicating in the network, it is preferable to establish two way communication between them (known as "full duplex mode").

EP-A-0439008 discloses a method of operating a token ring network. In a first "full duplex auto-configuration" mode the ring is initialized in conventional token ring mode, followed by a "2-station test" which ascertains whether only two stations are active in the network. If more than two stations are active in the network, token ring operation is maintained. If only two stations are active, the network switches to full duplex mode. This is an inefficient way of operating the network, and does not allow a new end station to enter the network in full duplex mode. In a second "full duplex fixed" mode, the network is initialized in full duplex mode without any "2-station test", and without reverting to token ring mode in the event of a third station's presence or cessation of full duplex operation by the other station. This is a fairly crude method, which does not allow conventional token ring operation.

SUMMARY OF THE INVENTION

In accordance with one aspect of the present invention, a method of connecting a new end station to a ring communication system for connecting a number of end stations comprises:

i) sensing an attempt by a new end station to attach to the ring;

ii) determining whether there is a single end station only existing on the ring; and, iiia) if it is determined that there is more than one end station on the ring, allowing the new end station to attach to the ring and maintaining the ring communication configuration; or b) if it is determined that there is a single end station only on the ring, breaking the ring configuration and setting up two separate communication paths between the new end station and the existing end station.

In accordance with a second aspect of the present invention, a ring communication system comprises communication means for connecting a number of end stations together in a ring configuration; and control means for carrying out a method according to the first aspect of the invention.

This invention specifically addresses the case where a new end station wishes to join a ring having only a single end station and enables the aggregate bandwidth of the network in that case to be doubled by setting up two separate or independent communication links between the stations. The negotiation allowing full duplex operation is undertaken before the end station has entered the ring.

In some cases, the use of two separate or independent communication links can be used to enable relatively long cables or poorer quality cables to be used. Thus, crosstalk and other interference which can occur between adjacent links in a cable can be minimized by arranging for only one of the communication paths to be active at any one time.

If the system is operating in the "separate path" or full duplex mode, then an additional station can only attach if the system reverts to normal ring based operation. For example, if one of the stations operating in full duplex mode detects an initialization frame from a third station then it will cause communication to revert to a ring configuration.

In many such systems, a hub unit is provided typically with an end station located within the hub unit. In that case, the end station within the hub unit will constitute the existing end station.

Preferably, the method further comprises causing the new end station to emit data indicating whether it is capable of operating in the "separate path" mode. This then enables the system to decide whether it should then carry out steps ii) and iii). The present invention allows the hub unit to be a dual mode hub which can be used with end stations which could be normal token ring stations, full duplex only end stations, or dual mode stations (full duplex and normal token passing).

BRIEF DESCRIPTION OF THE DRAWINGS

An example of a ring communication system and method according to the invention will now be described and contrasted with a conventional system with reference to the accompanying drawings, in which.

DETAILED DESCRIPTION OF A PREFERRED EMBODIMENT

The example to be described will be based on a token ring implemented on copper cables in a conventional hub based configuration.

Figure 1:
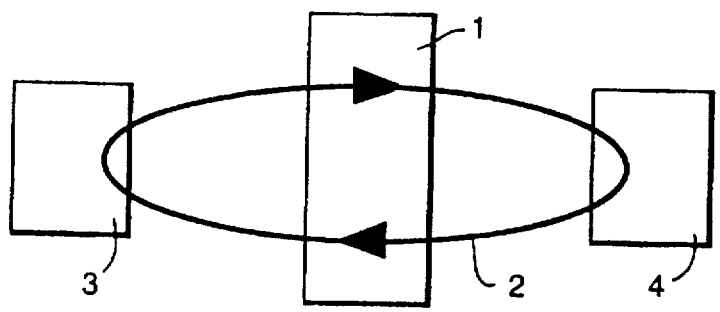
FIG. 1 illustrates a conventional ring topology.

FIG. 1 illustrates a conventional token ring system, for example implementing the IEEE 802.5 protocol. The system comprises a hub unit 1 which controls communication around a ring 2 between end stations 3,4. In practice, single cables will link the stations 3,4 to the hub unit 1 with the ring being defined within the hub unit 1. As can be seen in FIG. 1, a connection exists between both stations 3,4 but at any instant data or control information will only be passing between station 3 and station 4 or station 4 and station 3.

The invention proposes that in the specific case where there are only two end stations 3,4 on the ring then the ring should be broken to define separate communication paths 5,6 along each of which data can be transmitted. The two links 5,6 operate independently of each other thus doubling the aggregate bandwidth of the network.

For convenience of operation, data frames passed between the two end stations could still be formatted as token ring frames so that any end-user applications are unaware of the new mode of operation of the end stations.

In some cases, the end stations 3,4 could be manually configured to operate in this "separate path" or "full duplex" mode but in other cases it is desirable to allow individual end stations to signal that they can support the full duplex method of operation in addition to the standard ring based protocol. An end station then may operate automatically in either mode.

Figure 3:
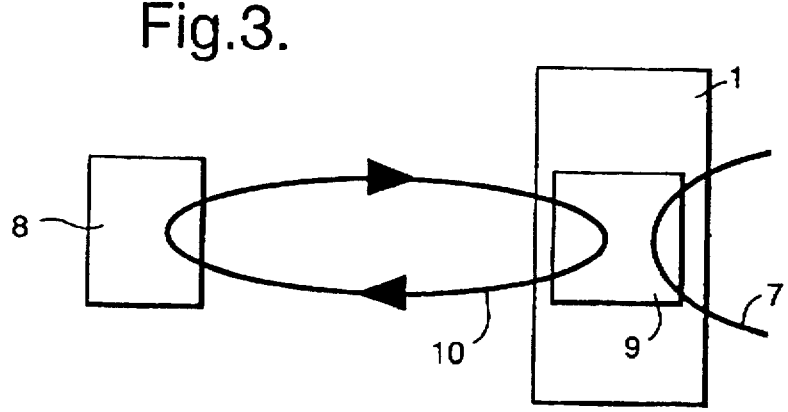
FIG. 3 illustrates an intermediate stage in the joining of a new end station to an existing ring according to an example of the invention; and, FIG. 4 illustrates a topology according to another embodiment of the invention.

FIG. 3 illustrates an existing ring communication system 7 of which the hub unit 1 forms a part. An end station 8 is to be attached to the system 7. Initially, the end station 8 is connected to the hub unit 1 via a central control system 9 so as to define a subsidiary ring 10. The system then operates as follows:

1) The end station 8 completes all its internal self tests. At this point, the two rings 7,10 are not joined at the hub 1.

2) The station 8 then sends test data to verify that the cable between the end station 8 and the hub 1 is operational. This data is sent around the ring 10 to the control system 9 and back along the ring to the end station 8. This is achieved typically via relays within the control system 9.

3) The end station 8 then sends a DC current along the ring 10 to the control system 9 to command the control system 9 to join the rings 7,10 and the end station 8 then enters the ring 7.

In a modified procedure according to an example of the present invention, the process is as follows:

1) The end station 8 completes all its internal self tests and at this stage the two rings 7,10 are not joined.

2) The station 8 sends test data to verify that the cable between the station 8 and the control system 9 is operational. The data is sent around the ring 10 and returns to the end station 8. Within the test data, the end station 8 indicates that it is capable of entering full duplex mode. This can be achieved by including a predefined series of characters within the test data. Alternatively, the end station could assert a DC phantom drive signal in a non-standard manner to indicate its ability to act as a full duplex end station.

3) The control system 9 within the hub unit 1 may be unwilling to allow full duplex mode operation. This may be because there are already several stations on the ring 7 or it is unable to recognize the pre-defined data pattern. In that case, the end station 8 joins the ring 7 in the conventional manner as described above (see step 3).

4) If, however, the control system 9 is able to allow the end station 8 to join in the full duplex mode (because there is only one other end station on the ring 7) then the control system 9 modifies the test data from the end station 8 and returns it around the ring 10 to the end station 8. In other words, the test data from the end station 8 is not simply looped at the control system 9 but read, modified and sent back to the end station 8. Alternatively, the control system 9 could send an additional message to the end station 8.

Figure 2:
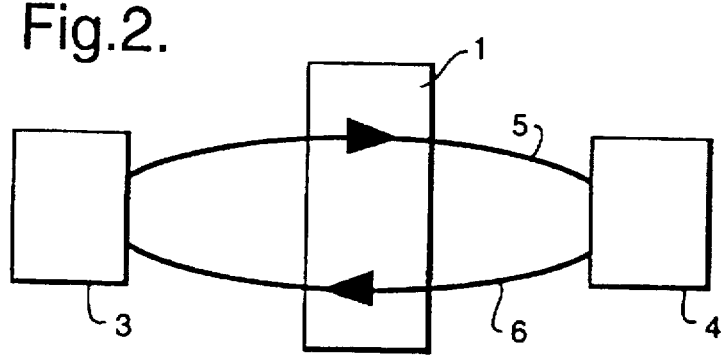
FIG. 2 illustrates a topology according to an example of the invention.

5) The end station 8 then sends a DC current along the transmit side of the ring 10 to the control system 9 to join the rings 7,10 in the full duplex mode similar to that shown in FIG. 2.

Step 5 is optional rather than necessary, as in most cases in full duplex mode the hub 1 would have to act as a LAN bridge for a full duplex station. Step 4 would then be sufficient to allow the hub to move frames onto the "backbone" ring.

The above description is applicable to token ring communication protocols but with suitable modification could be used with other ring communication protocols such as FDDI.

A fully automatic system has been described above in connection with FIG. 3 but in other configurations the system could be manually transferred to full duplex mode.

Figure 4:
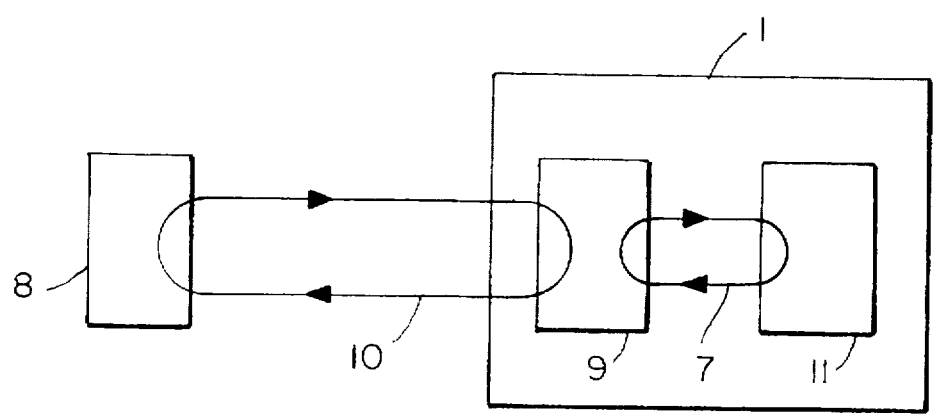

The end station on the ring 7 is not shown in FIG. 3 and in some cases an end station 11 could be located within the hub unit 1, as illustrated in FIG. 4, for example.

We claim:

1. A method of connecting a new end station to a ring communication system, having a ring communication configuration, for connecting a number of end stations, the method comprising:

i) sensing an attempt by the new end station to attach to the ring;

ii) before allowing said new end station to attach to the ring, determining whether there is a single end station only existing on the ring; and, iiia) if it is determined that there is more than one end station on the ring, allowing the new end station to attach to the ring and maintaining the ring communication configuration; or b) if it is determined that there is a single end station only on the ring, breaking the ring configuration and setting up two separate communication paths between the new end station and the existing end station.

2. A method according to claim 1, wherein the new end station generates pre-defined data to indicate its ability to operate in a "separate path" mode.

3. A method according to claim 1, wherein the single end station is located within a hub unit.

4. A ring communication system having a ring communication configuration and comprising communication means for connecting a number of end stations together in a ring; and control means for carrying out a method according to the following steps:

i) sensing an attempt by a new end station to attach to the ring;

ii) before allowing said new end station to attach to the ring, determining whether there is a single end station only existing on the ring; and iiia) if it is determined that there is more than one end station on the ring, allowing the new end station to attach to the ring and maintaining the ring communication configuration; or b) if it is determined that there is a single end station only on the ring, breaking the ring communication configuration and setting up two separate communication paths between the new end station and the existing end station.

5. A system according to claim 4, further comprising a hub unit, the control means being situated within the hub unit.

6. A system according to claim 5, wherein a single end station is located within the hub unit.

7. A system according to claim 4, further comprising a hub unit, wherein the hub unit is adapted for use with normal token ring stations, full duplex only end stations or dual mode stations.

* * * * *